(12) United States Patent
Nishida

(10) Patent No.: US 11,019,948 B2
(45) Date of Patent: Jun. 1, 2021

(54) DRINKING DRAMATIZATION GLASS, DRINKING DRAMATIZATION SYSTEM, REMOTE TOAST COUNTER SYSTEM AND STORAGE MEDIUM

(71) Applicant: NETAPPLI CO., LTD., Ishikawa (JP)

(72) Inventor: Makoto Nishida, Ishikawa (JP)

(73) Assignee: NETAPPLI CO., LTD., Ishikawa (JP)

( * ) Notice: Subject to any disclaimer, the term of this patent is extended or adjusted under 35 U.S.C. 154(b) by 0 days.

(21) Appl. No.: 17/044,730

(22) PCT Filed: Jun. 10, 2019

(86) PCT No.: PCT/JP2019/022913
§ 371 (c)(1),
(2) Date: Oct. 1, 2020

(87) PCT Pub. No.: WO2019/240074
PCT Pub. Date: Dec. 19, 2019

(65) Prior Publication Data
US 2021/0085105 A1    Mar. 25, 2021

(30) Foreign Application Priority Data
Jun. 12, 2018  (JP) .............................. JP2018-111523

(51) Int. Cl.
*H04M 1/04* (2006.01)
*A47G 19/22* (2006.01)
*A47G 23/16* (2006.01)

(52) U.S. Cl.
CPC ......... *A47G 19/2227* (2013.01); *A47G 23/16* (2013.01); *H04M 1/04* (2013.01);
(Continued)

(58) Field of Classification Search
CPC .............................. A47G 19/2227; G09F 23/08
See application file for complete search history.

(56) References Cited

U.S. PATENT DOCUMENTS 8,550,288 B2 * 10/2013 Briar ...................... G09F 23/06
220/664
2008/0100469 A1   5/2008 Goldburt
(Continued)

FOREIGN PATENT DOCUMENTS

JP    S6292769 U    6/1987
JP    H0181970 U    6/1989
(Continued)

OTHER PUBLICATIONS

International Search Report (ISR) dated Jul. 16, 2019, issued for International application No. PCT/JP2019/022913. (1 page).
(Continued)

*Primary Examiner* — Qutbuddin Ghulamali
(74) *Attorney, Agent, or Firm* — Law Office of Katsuhiro Arai

(57) ABSTRACT

A drinking dramatization glass (1) includes: a glass body (10) being a bottomed cylinder with a top opening (11); a fixing mechanism (16) for fixing an image display device (80) on the side face of the glass body; a transparent part (12) for viewing, from the exterior of the glass body, an image (81) displayed on an image display part (85) of the image display device; and a reflective mirror (30) placed inside the glass body; wherein the image displayed on the image display part is reflected on the reflective mirror, passes through the transparent part, and reaches the exterior of the glass body. Unlike the conventional drinking dramatization glasses, there is no need to provide a storage part or waveguide part. The drinking dramatization glass can let an individual enjoy oneself alone or together with others in remote locations, while also presenting many different dramatizing effects.

20 Claims, 16 Drawing Sheets

(52) U.S. Cl.
CPC ............... *A47G 2019/2238* (2013.01); *A47G 2019/2244* (2013.01)

(56) References Cited

U.S. PATENT DOCUMENTS

2011/0088296 A1* 4/2011 Schnuckle .............. G09F 19/16
40/409
2015/0182797 A1* 7/2015 Wernow ............... A61B 5/6887
434/247

FOREIGN PATENT DOCUMENTS

| JP | H0345213 A | 2/1991 |
| JP | 3045147 U | 1/1998 |
| JP | 3086140 U | 6/2002 |
| JP | 2005099159 A | 4/2005 |
| JP | 6337256 B1 | 6/2018 |

OTHER PUBLICATIONS

Cresco, Ltd., Refreshing projection, I tried a cool projection, Jul. 3, 2018, https://www.cresco.co.jp/blog/entry/1679/ (5 pages).

* cited by examiner

[FIG. 1]
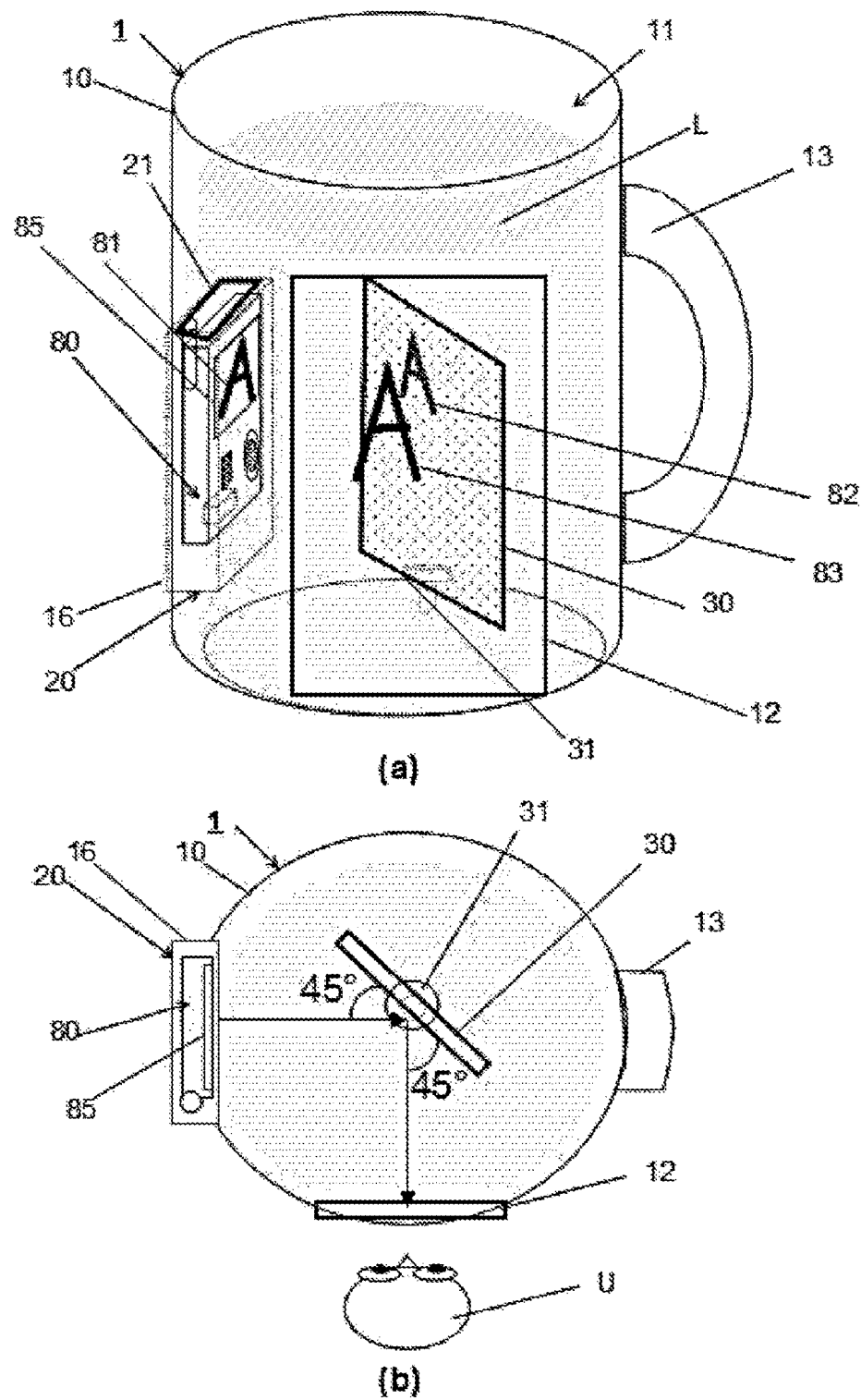

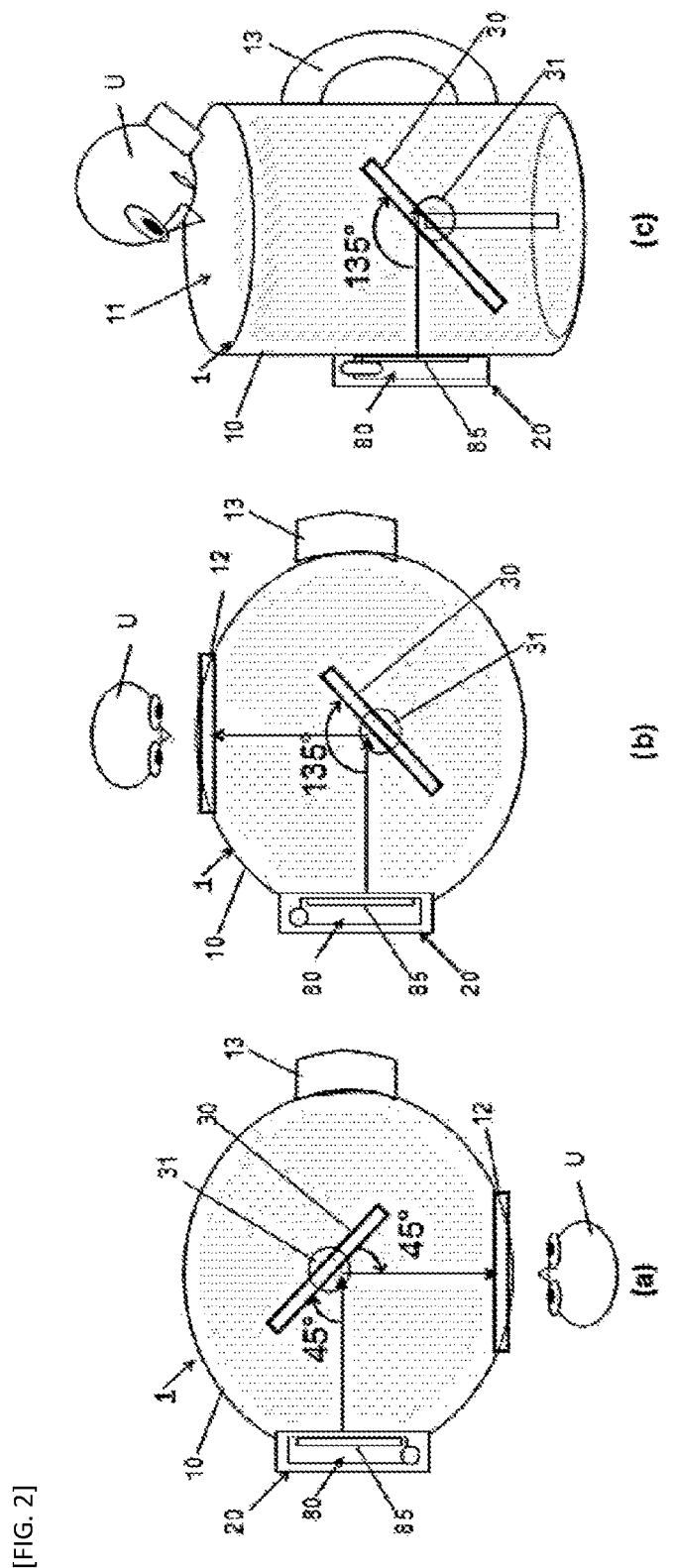
[FIG. 2]

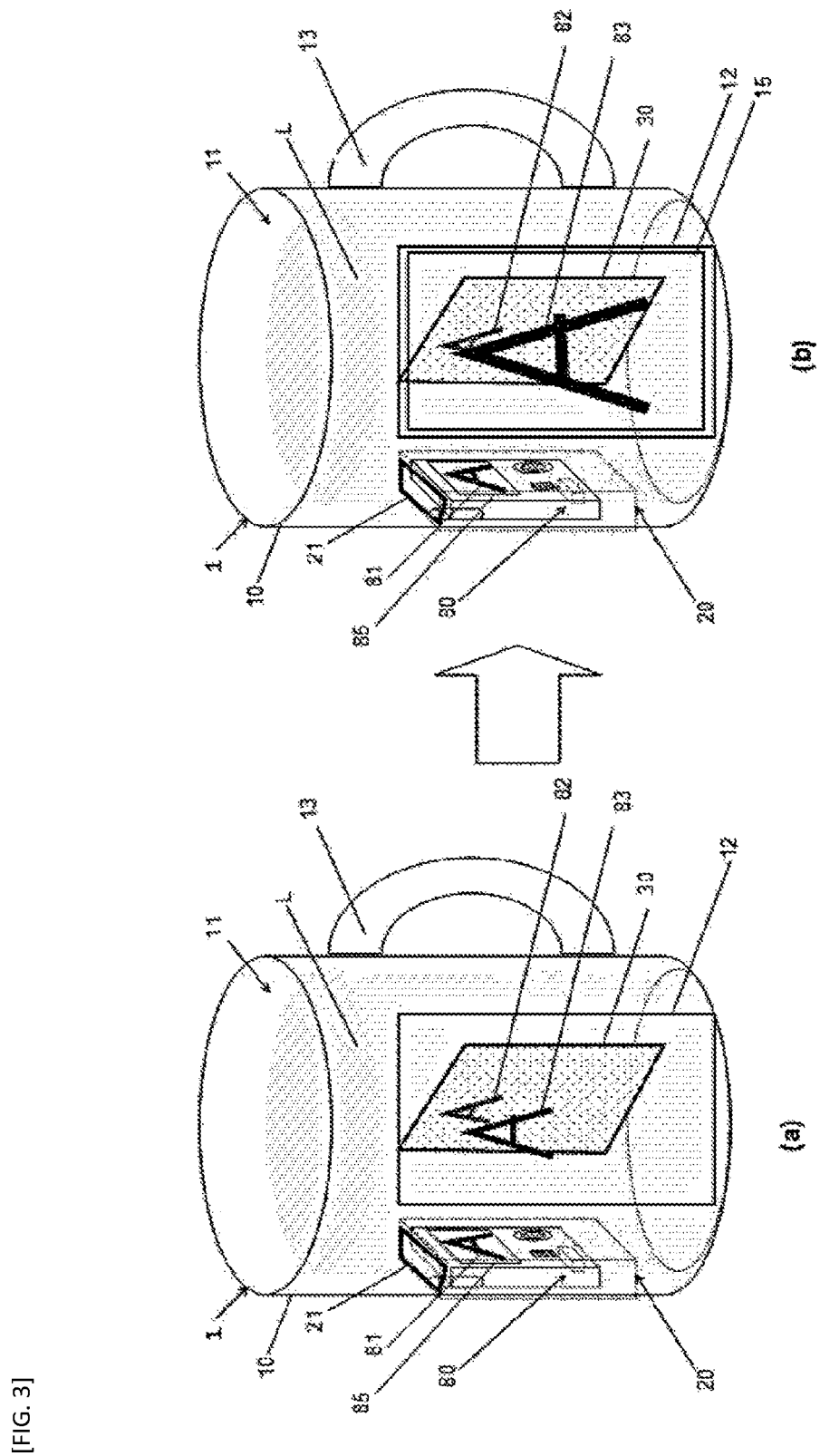
[FIG. 3]

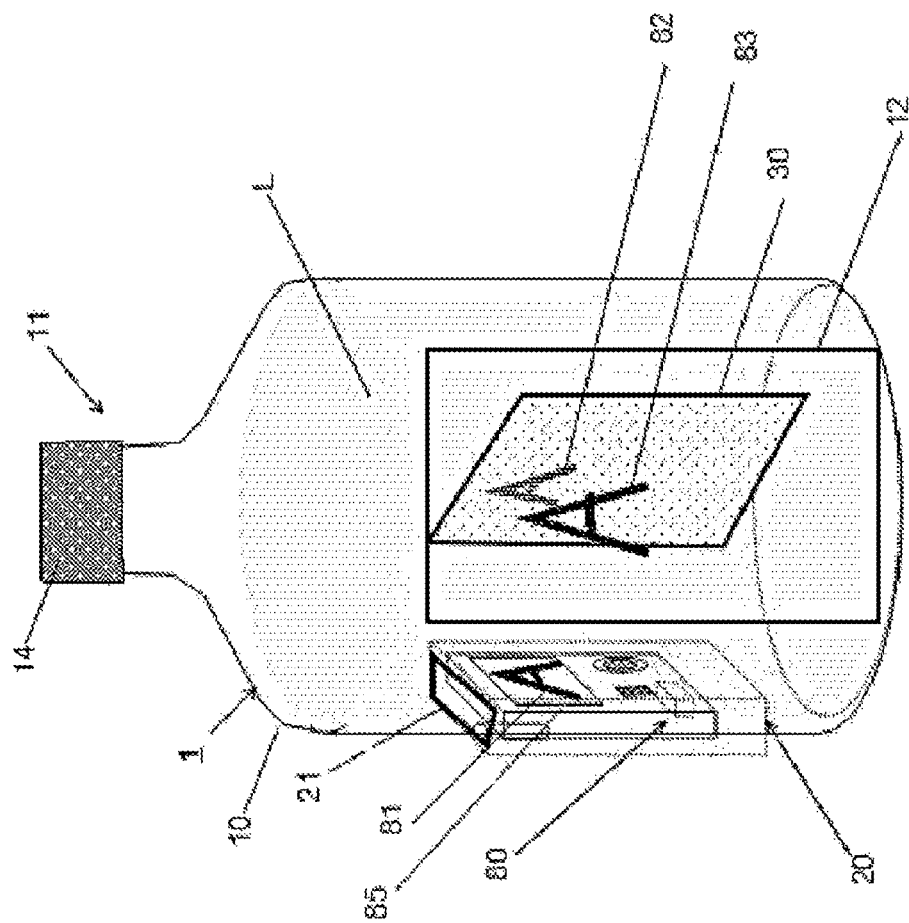
[FIG. 4]

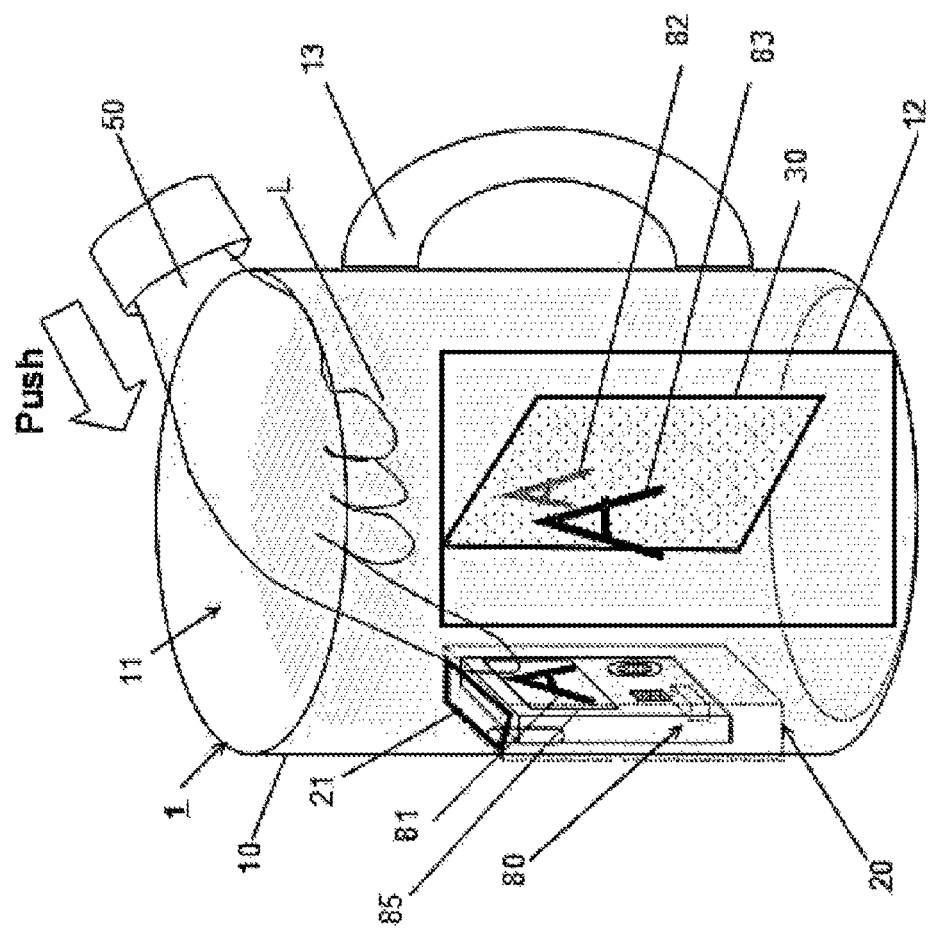
[FIG. 5]

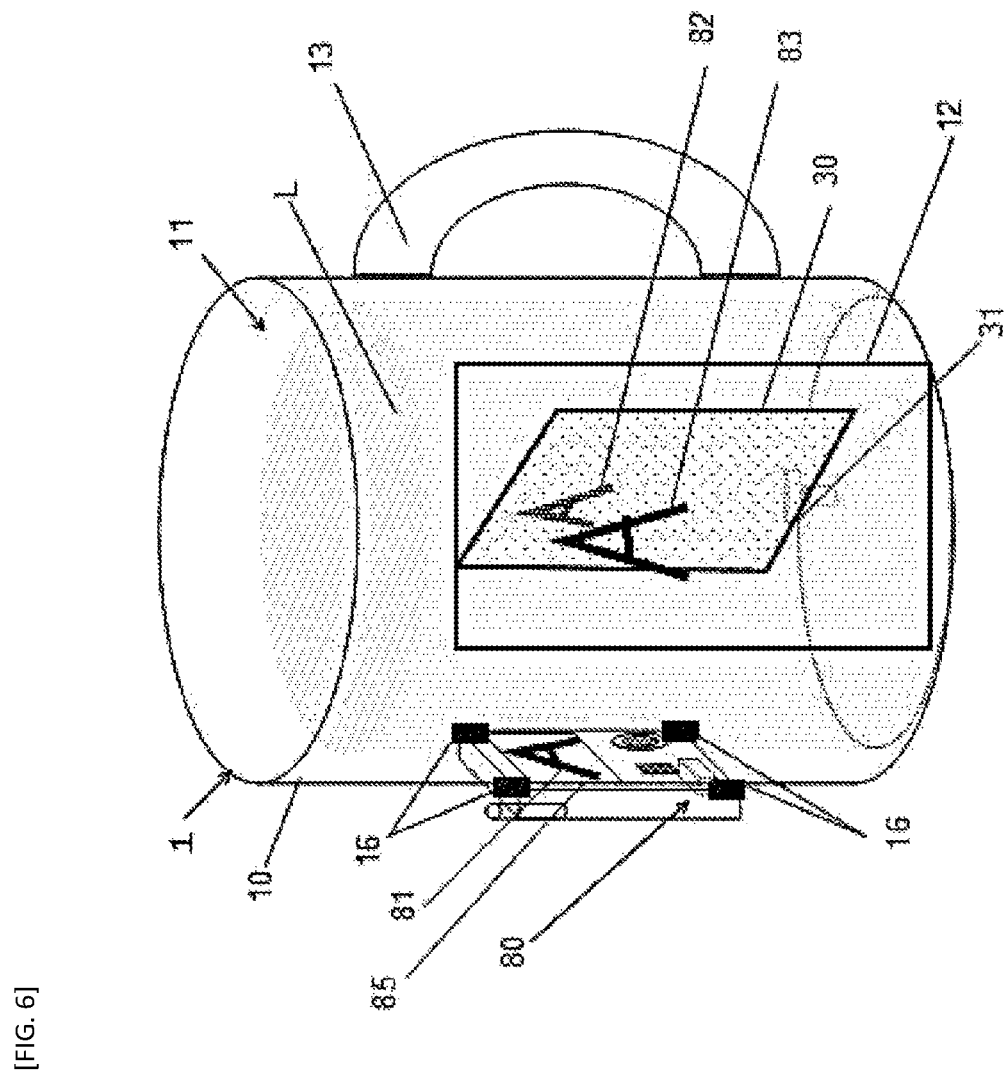
[FIG. 6]

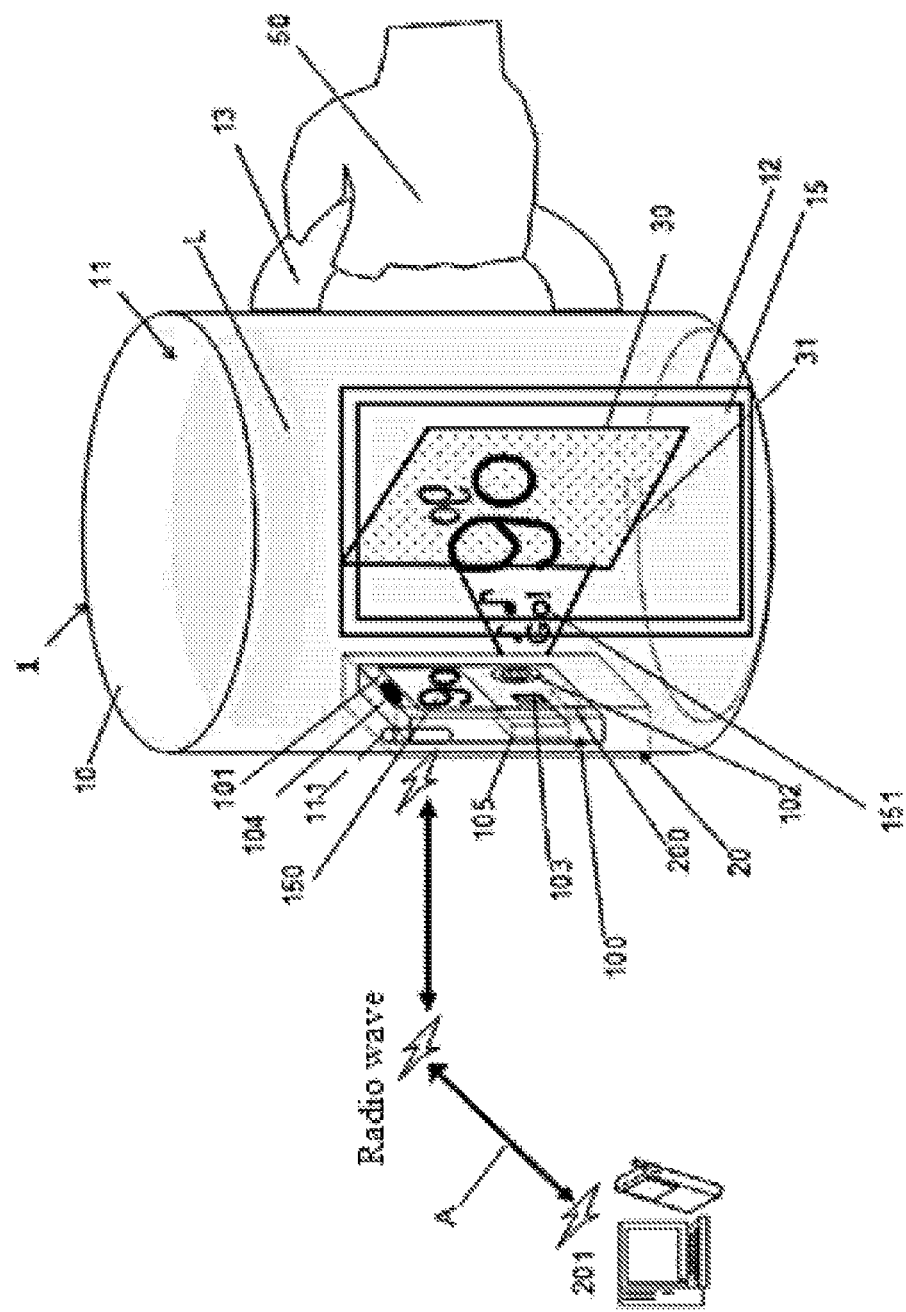
[FIG. 7]

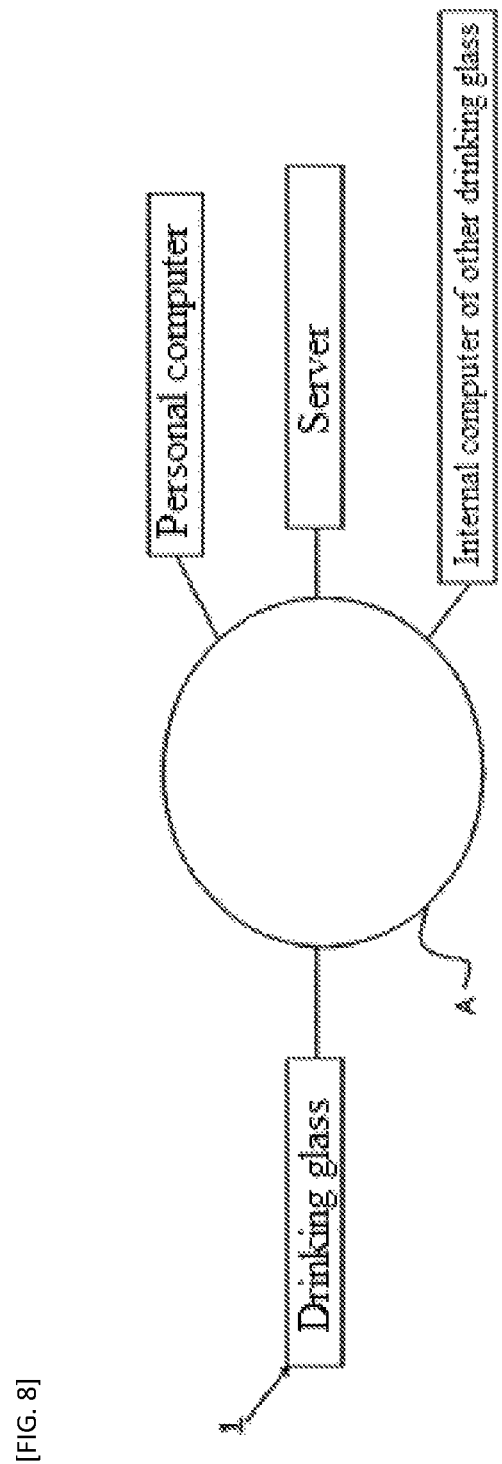
[FIG. 8]

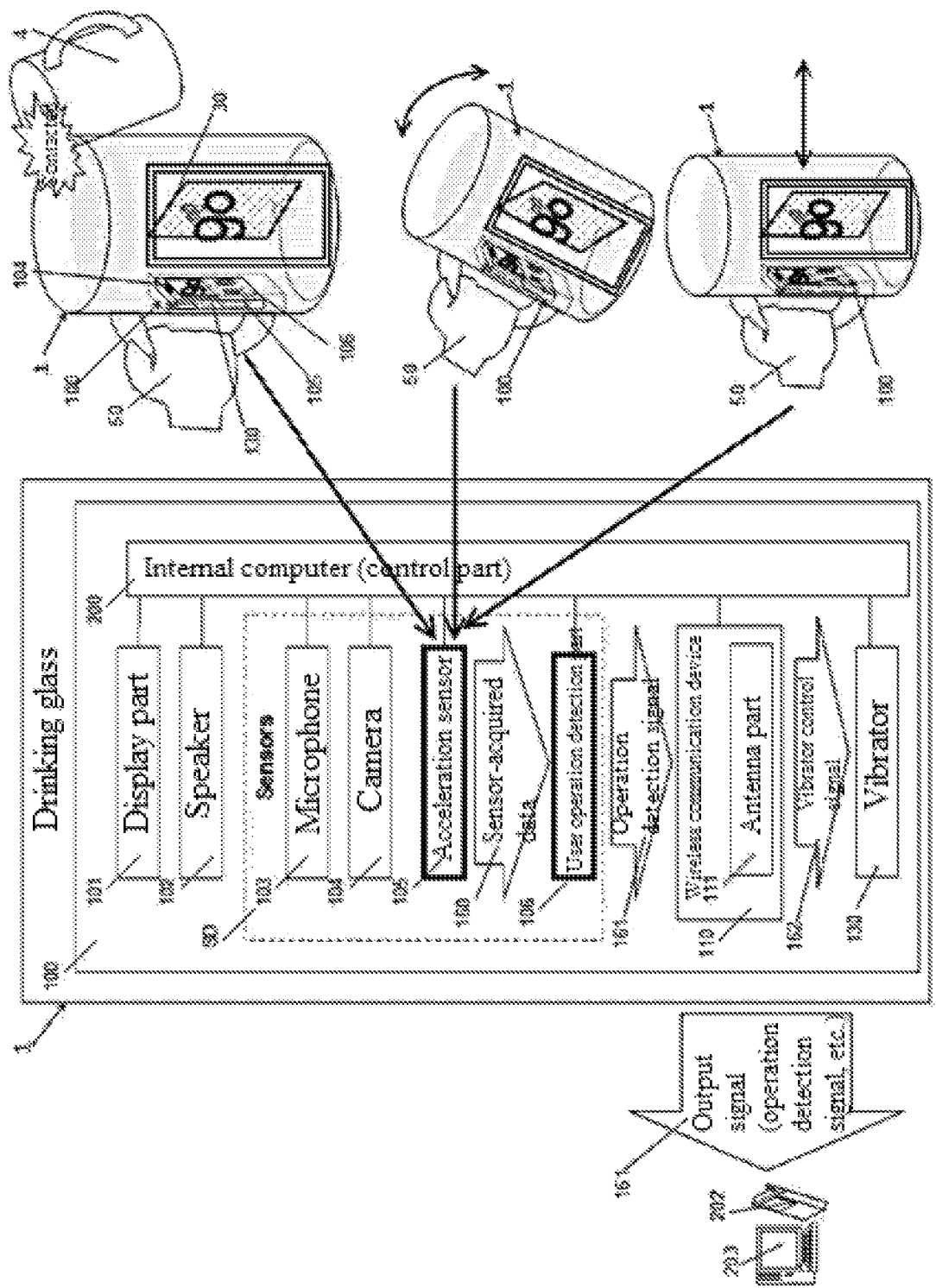
[FIG. 9]

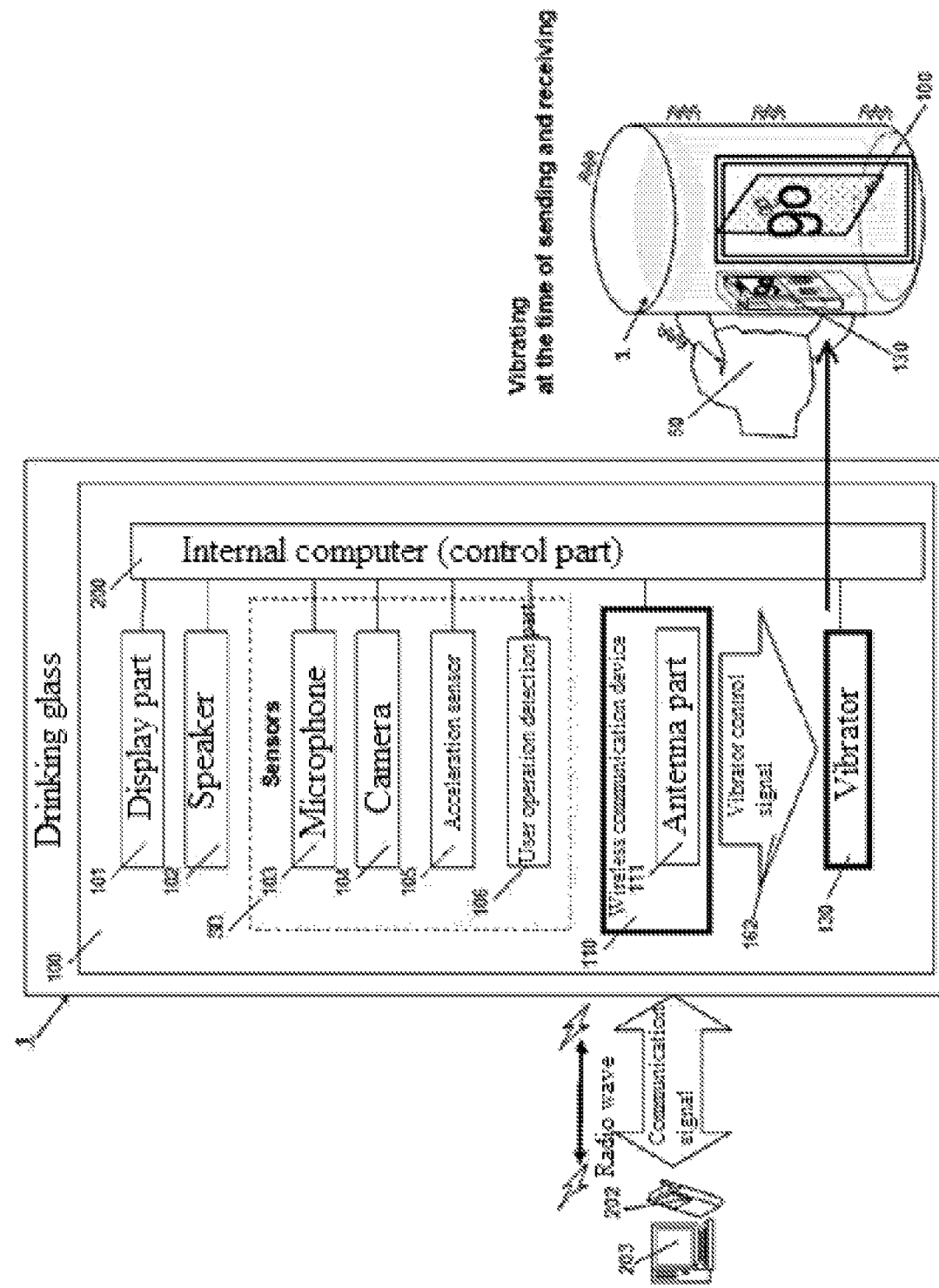
[FIG. 10]

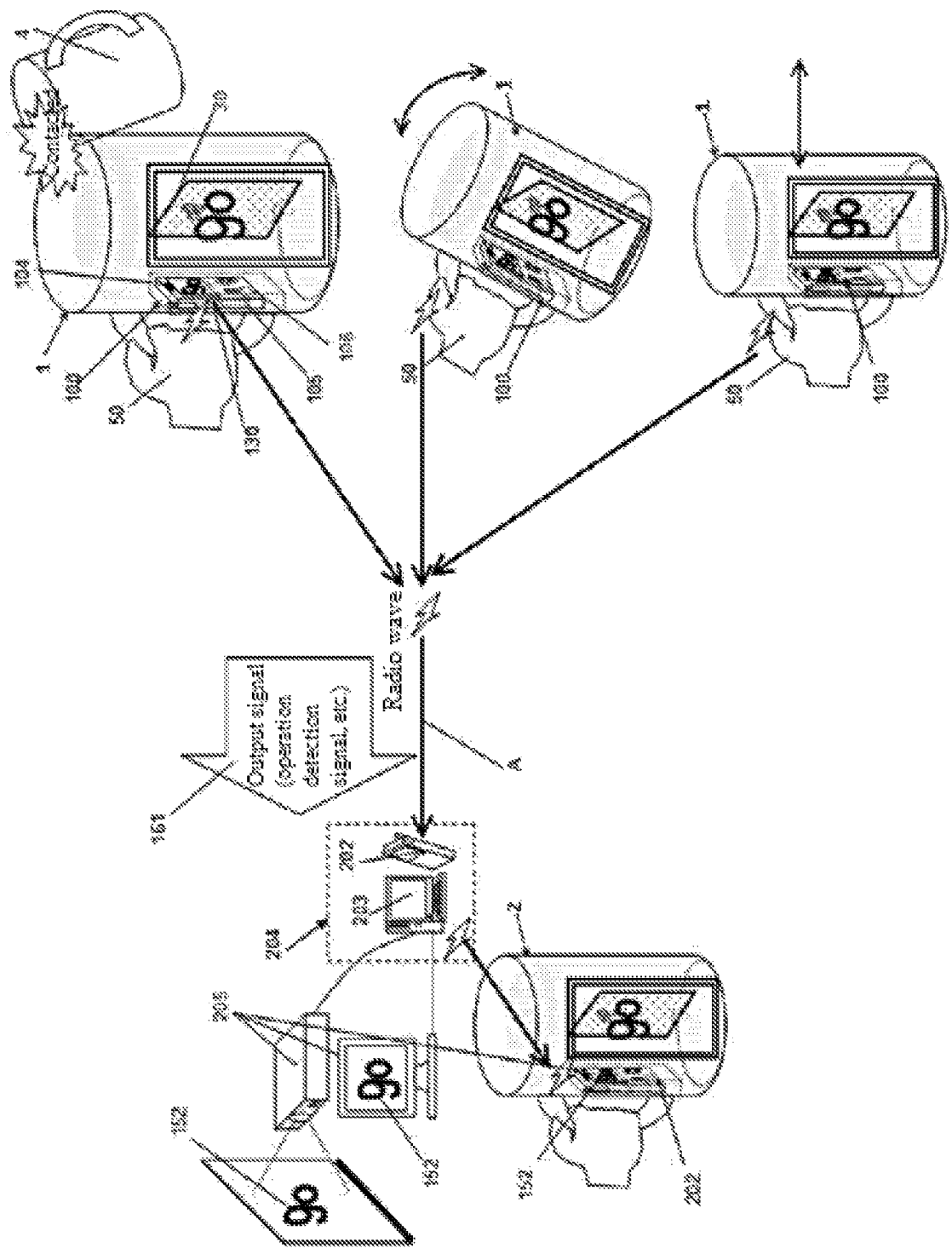
[FIG. 11]

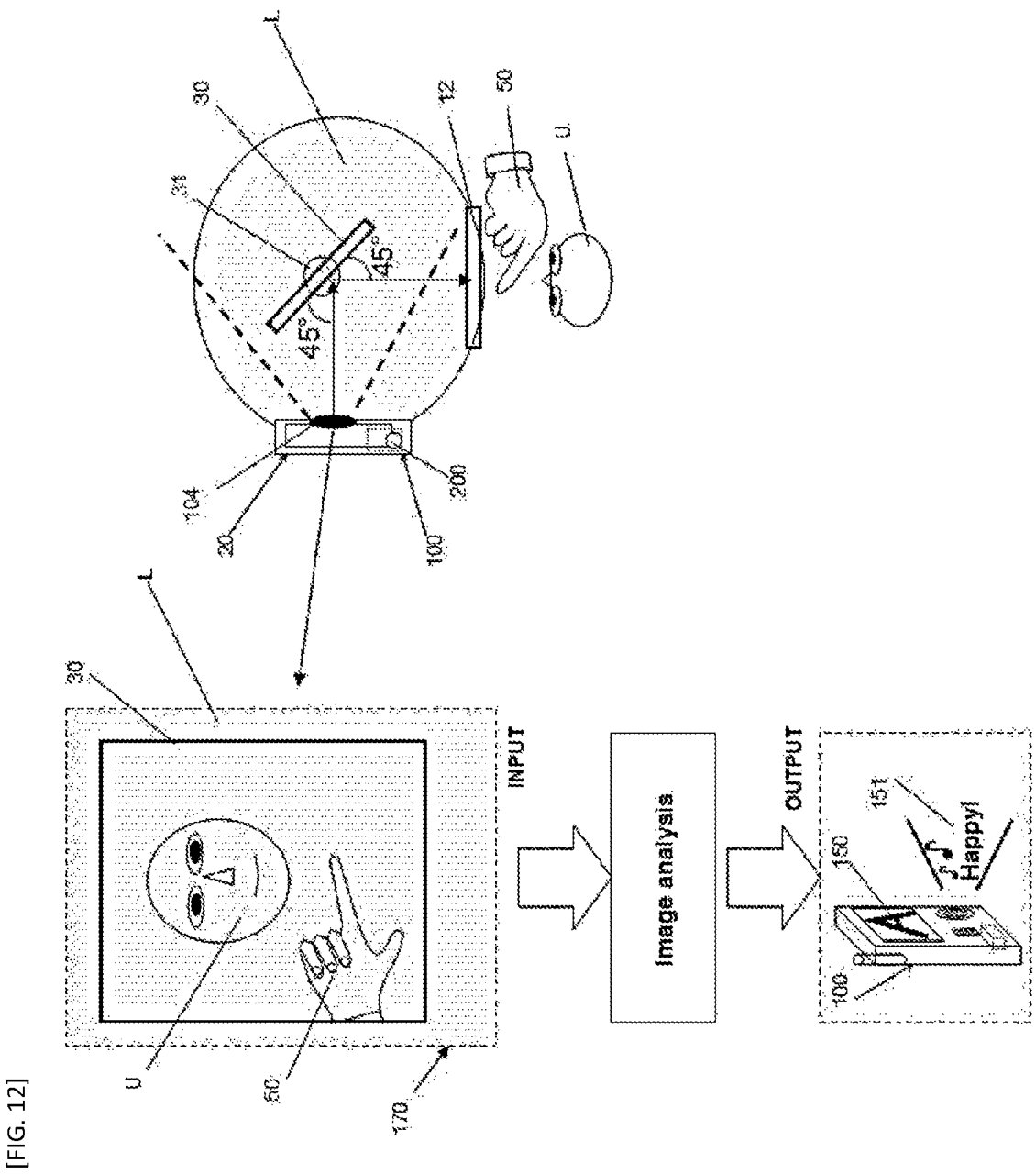
[FIG. 12]

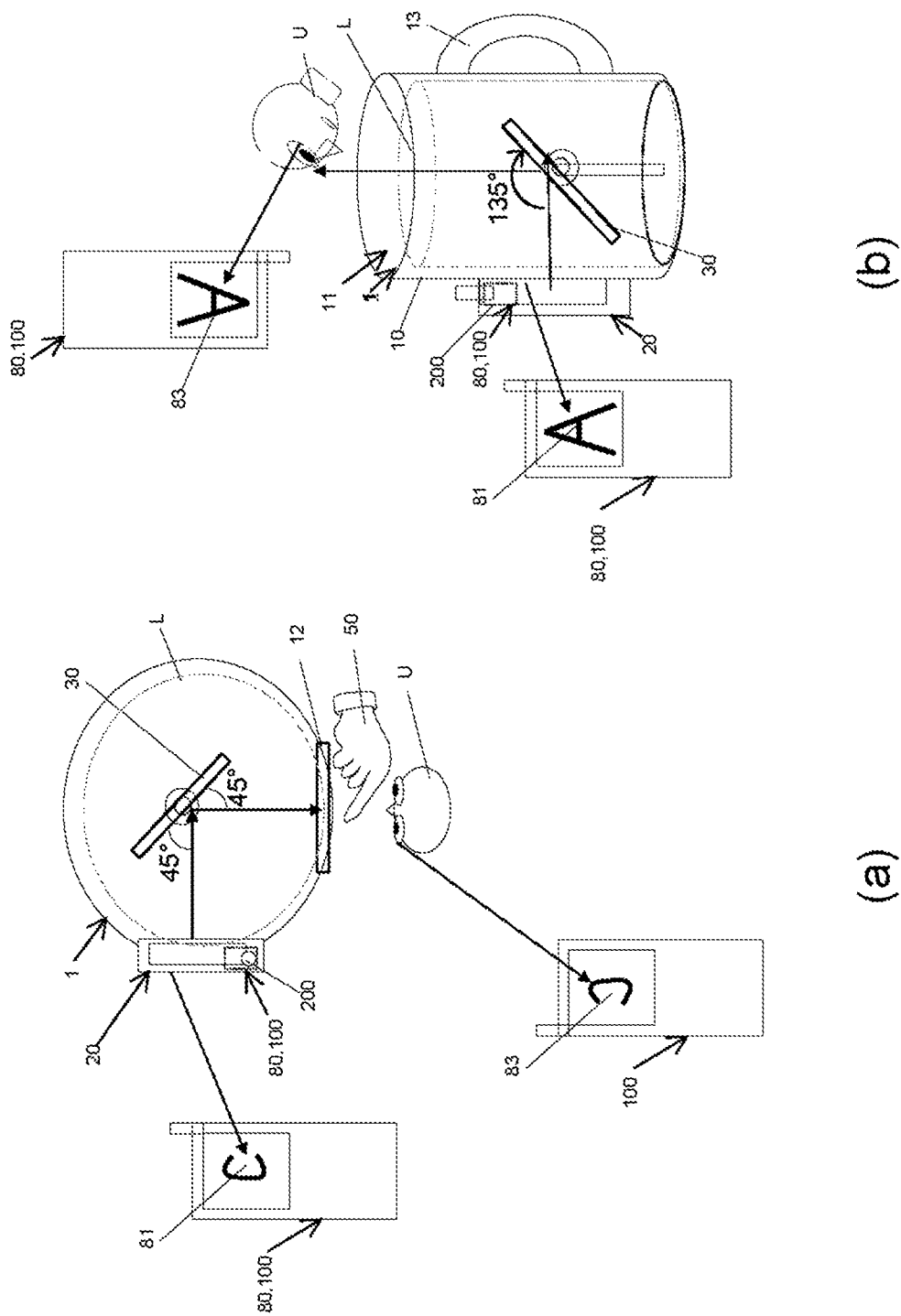

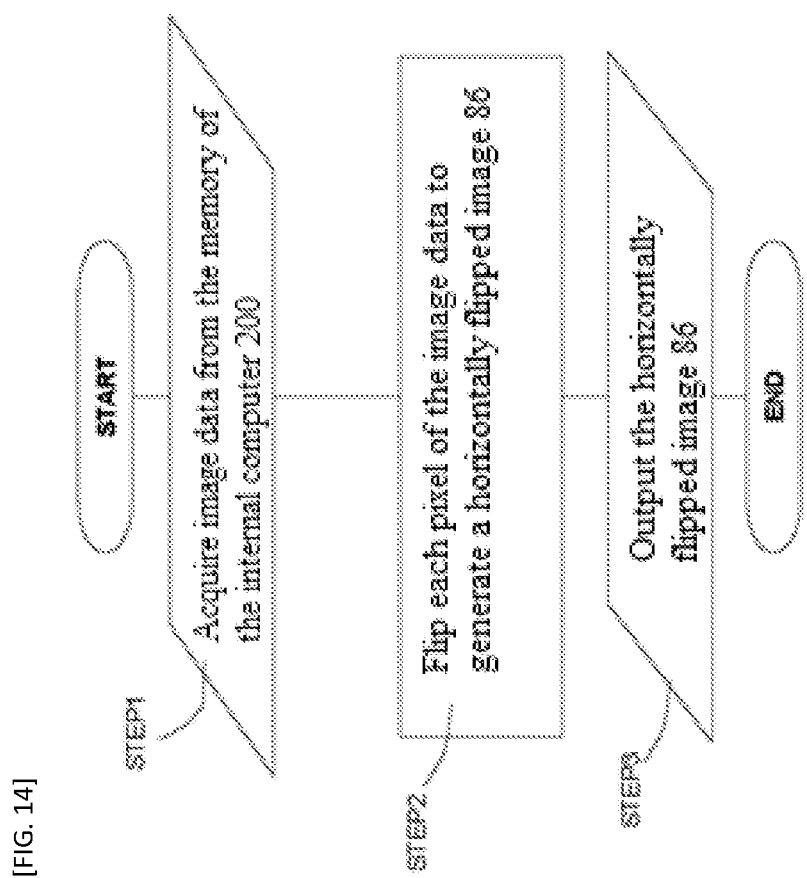
[FIG. 14]

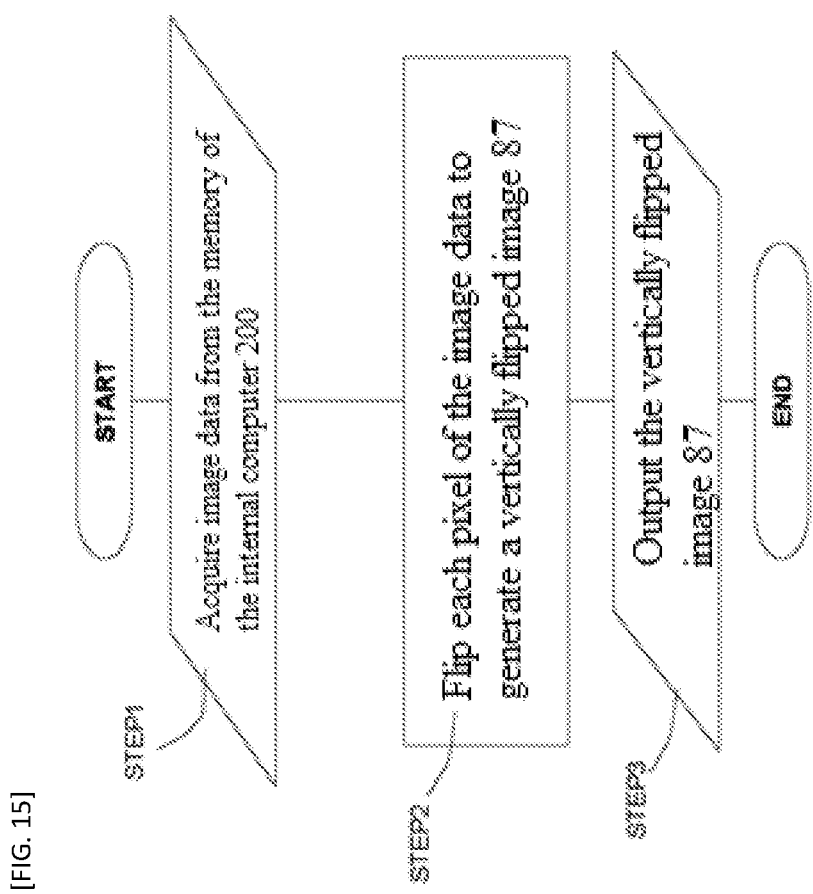
[FIG. 15]

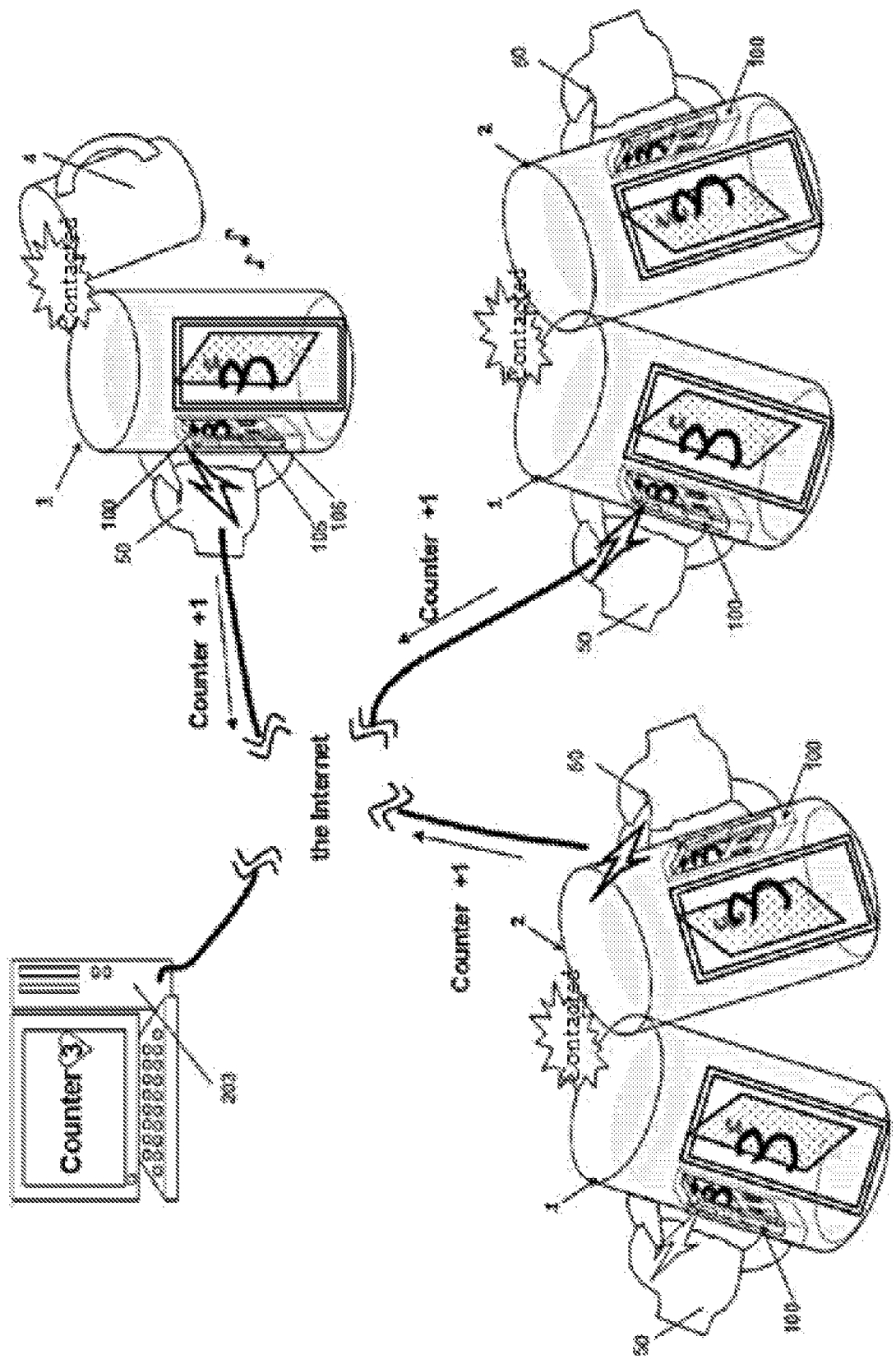
[FIG. 16]

DRINKING DRAMATIZATION GLASS, DRINKING DRAMATIZATION SYSTEM, REMOTE TOAST COUNTER SYSTEM AND STORAGE MEDIUM

CROSS-REFERENCE TO RELATED APPLICATIONS

This application is the U.S. National Phase under 35 U.S.C. § 371 of International Application PCT/JP2019/022913, filed Jun. 10, 2019, which claims priority to Japanese Patent Application No. JP2018-111523, filed Jun. 12, 2018. The International Application was published under PCT Article 21(2) in a language other than English.

TECHNICAL FIELD

The present invention relates to a drinking dramatization glass that lets an individual enjoy oneself alone or together with others in remote locations, while also presenting many different dramatizing effects. Additionally, the present invention relates to a drinking dramatization glass that allows an image display device to be fixed with ease on the glass body, while also allowing the orientation of an image display part of the image display device to be changed with ease. Additionally, the present invention relates to, using such drinking dramatization glasses, a drinking dramatization system, a remote toast counter system, and a storage medium.

BACKGROUND ART

At parties, receptions, and other events, oftentimes the participants toast by clinking their glasses containing drinks, to share joys with one another.

In the past, glasses have been developed that offer various functions in addition to containing drinks.

For example, Patent Literatures 1 and 2 disclose an art of using a sensor to detect that a glass has been raised, and then outputting various sounds from a speaker provided in the lower part of the glass.

Patent Literature 3 discloses an art, pertaining to a glass equipped with a means for detecting its tilt angle, of producing voices according to the tilt angle of the glass.

Patent Literature 4 discloses an art of placing a light-emitting piece in an intermediate layer between the interior wall and the exterior wall of a glass, with the light-emitting piece emitting light when the glass is shaken.

Patent Literatures 5 and 6 disclose an art of placing a display device on the surface of a glass and allowing the image displayed on the display device to be changed manually or according to the output of a motion sensor that detects the state of the glass.

Patent Literature 7 discloses an art of placing a display device on the surface of a glass, while placing a control module and connection terminals in a space at the bottom of the glass. By hardwiring it to an external computer via the connection terminals, the control module can download multiple types of image data and display them on the display device.

Patent Literature 8 discloses a drinking dramatization glass invented by the inventor of the invention under the present application for patent. This drinking dramatization glass comprises: a glass body; a storage part extending from the bottom part, toward the interior side, of the glass body and used for storing a mobile communication device; and a waveguide part extending from the side face, toward the interior side, of the glass body and used for letting the radio waves from the mobile communication device pass through. This drinking dramatization glass can let the radio waves from the mobile communication device pass through to the exterior to enable wireless communication, even when a drink is filled inside the glass body.

BACKGROUND ART LITERATURE

Patent Literature

Patent Literature 1: Japanese Utility Model Laid-open No. Sho 62-92769
Patent Literature 2: Japanese Patent Laid-open No. Hei 3-45213
Patent Literature 3: Japanese Utility Model Laid-open No. Hei 1-81970
Patent Literature 4: Japanese Utility Model Registration No. 3086140
Patent Literature 5: Japanese Patent Laid-open No. 2005-99159
Patent Literature 6: U.S. Patent Application Laid-open No. 2008/0100469, Specification
Patent Literature 7: U.S. Pat. No. 8,550,288, Specification
Patent Literature 8: Japanese Patent No. 6337256

SUMMARY OF THE INVENTION

Problems to Be Solved by the Invention

However, Patent Literatures 1 to 6 mentioned above involve outputting voices, images, etc., that have been pre-recorded in a memory, etc., or causing a light-emitting piece to emit light, which presents a problem of lack of variations in, and limitations of, dramatizing effects.

Patent Literature 7 requires hardwire connection with an external computer via the connection terminals, which presents a problem of cumbersome operations, as well as a problem of malfunction if the connection terminals get wet.

Also, Patent Literatures 1 to 7 cater to the enjoyment of only the people in the sole space where the glass is placed, which presents a problem that they cannot share the joy with others in remote locations.

Also, Patent Literature 8 has a storage part and a waveguide part provided inside the glass body, which presents a problem that the capacity of the glass body will decrease, as well as a problem that the manufacturing steps will increase. Additionally, because the insertion opening of the storage part is located at the bottom part of the glass body, the glass body must be lifted when the mobile communication device is inserted or removed through this insertion opening, which presents a problem of difficulty answering an unexpected incoming call. Also, the mobile communication device in the glass body has a fixed orientation, which presents a problem that the orientation of the image display part cannot be changed.

In light of the aforementioned problems, an object of the present invention is to provide a drinking dramatization glass that lets an individual enjoy oneself alone or together with others in remote locations, while also presenting many different dramatizing effects. Another object of the present invention is to provide a drinking dramatization glass that allows an image display device to be fixed with ease on the glass body, while also allowing the orientation of an image display part of the image display device to be changed with ease. Yet another object of the present invention is to provide a drinking dramatization system and a remote toast counter system, both using such drinking dramatization glasses, as well as a storage medium for use therewith.

Means for Solving the Problems

The drinking dramatization glass proposed by the present invention comprises: a glass body being a bottomed cylinder with a top opening; a fixing mechanism for fixing an image display device on the side face of the glass body; a transparent part for viewing, from the exterior of the glass body, an image displayed on an image display part of the image display device; and a reflective mirror placed inside the glass body and having at least one layer that does not transmit light; which is characterized in that the image displayed on the image display part is reflected on the reflective mirror, passes through the transparent part, and reaches the exterior of the glass body.

Also, it is characterized in that the image display device is a part of a mobile communication device.

Also, it is characterized in that a part or all of the transparent part constitutes a lens so that the image display part can be magnified for viewing from the exterior of the glass body.

Also, it is characterized in that the reflecting direction of the image is changed in the horizontal direction and/or in the vertical direction by changing the orientation of the reflective mirror in the horizontal direction and/or in the vertical direction.

Also, it is characterized in that the fixing mechanism comprises an insertion opening through which to insert the image display device, and a storage part for storing the image display device.

Also, it is characterized in that the storage part is made of a flexible material, and by applying an external force, the storage part can be deformed to operate the image display device in the storage part.

Also, it is characterized in that it has a lid for closing off the top opening.

Also, it is characterized in that the image display device is a part of a mobile communication device, the mobile communication device has a user operation detection part and an acceleration sensor, and the user operation detection part detects, based on output data from the acceleration sensor, whether the user has moved or tilted the glass body or clinked it against other object (hereinafter referred to as "user operation") and transmits an output signal to the exterior.

Also, it is characterized in that the image display device is a part of a mobile communication device, the mobile communication device has a vibrator, and the vibrator vibrates at the timing of communication performed by the mobile communication device via radio waves, thereby causing the glass body to vibrate.

Also, it is characterized in that the mobile communication device has a camera, and the camera captures an image at the timing of detection of the user operation by the user operation detection part and transmits the captured image data to the exterior.

The drinking dramatization system proposed by the present invention comprises the aforementioned drinking dramatization glass, an external computer, and an exterior image display device; which is characterized in that the exterior computer, upon receiving the output signal, generates prescribed image data and transmits it to the external image display device, and the external image display device displays the image data as image content.

Also, it has the aforementioned drinking dramatization glass; which is characterized in that the sound and/or image output from the mobile communication device changes based on the image of the reflective mirror as captured by the camera.

The remote toast counter system proposed by the present invention comprises the aforementioned drinking dramatization glass, and an external server computer; which is characterized in that the external server computer receives the output signal, counts the number of times the signal has been received, and records the result as a cumulative number of toasting operations, so that the user can view the cumulative number of toasting operations.

The storage medium proposed by the present invention is a storage medium in which a computer program used by the aforementioned drinking dramatization glass is saved; which is characterized in that the computer program horizontally flips or vertically flips the image.

Effects of the Invention

Skin depth is an indicator of the level of attenuation of the amplitude (strength) of a radio wave as determined by solving a wave motion equation derived from Maxwell's equation of electromagnetism, and represents a distance in which an electromagnetic field (radio wave) incident to a material attenuates to a strength of $1/e$ ($\approx 1/2.718 \approx 37$ [%]) (e is a natural logarithm).

Assuming that a radio wave with a frequency of 1 [GHz] is made incident to sea water, which is a representative example of liquid; in this case, a skin depth of 7.9 [mm] is obtained. This means that the distance in which the amplitude (strength) of the radio wave incident to sea water attenuates to $1/e$ ($\approx$[%]) is 7.9 [mm], and that, when a radio wave of 1 [GHz] (frequency ranges currently used by mobile phones in Japan are approx. 800 [MHz] to 3 [GHz]) is made incident to sea water in a glass cup, for example, it will attenuate to 37 [%] or less before making its way by no more than 1 [cm] from the surface of the cup. (In reality, it will attenuate more because of attenuation not only due to the sea water, but also due to the glass cup, etc. Also, with sea water taken from the waters with high concentrations of impurities and salt, the levels may far exceed the aforementioned sea water attenuation because of these impurities.) Other liquids, such as thick juices as well as cocktails and other alcoholic drinks made therewith, may contain more impurities than sea water, in which case they will naturally cause greater attenuation compared to sea water.

Also, the higher the frequency of a radio wave, the shorter its skin depth becomes. In recent years, frequencies of 1 [GHz] to 3 [GHz] or even higher are used by high-speed packet communication services, etc., for mobile phones and other mobile communication terminals; however, radio waves of these frequencies as well as 2.4 [GHz], 5 [GHz] (IEEE 802.11n), 60 [GHz] (IEEE 802.11ad) and other Wi-Fi wireless LANs, etc., are subject to much greater attenuation than those of a frequency of 1 [GHz].

As described above, city water, soft drinks, alcoholic drinks, and other liquids containing impurities have a property of blocking radio waves, unlike air.

When a liquid is poured in the glass body while the mobile communication device—which is a communication device equipped with an image display part and a voice output part capable of outputting image contents and voice contents, respectively, or specifically a mobile phone, smartphone, PDA, tablet terminal, etc.—is stored inside the glass body, the periphery of the mobile communication device is entirely or partially enclosed with the liquid, and therefore the liquid serves as a shielding material. As a result, problems will arise such as loss of communication function that utilizes radio waves, disabled communication of image data, voice data, etc., and significant lowering of baud rate [bps].

The drinking dramatization glass proposed by the present invention has an image display device fixed on the side face of the glass body, and the image on the image display part is reflected on a reflective mirror placed in the glass body. The image reflected on the reflective mirror passes through a transparent part of the glass body to reach the exterior of the glass body, and is viewed by the user. The image display device may be a part of a mobile communication device.

The drinking dramatization glass proposed by the present invention does not let a drink hinder communication, because the mobile communication device does not follow the convention of being stored inside the glass body, but it is fixed on the side face of the glass body instead. Accordingly, the mobile communication device can receive data from the exterior and output image content at the image display part even when a drink is filled in the glass body.

Also, against convention, there is no longer a need to provide a storage part or waveguide part inside the glass body, which allows for ensuring of sufficient capacity of the glass body as well as reduction of the manufacturing steps.

When the side face of the glass body is entirely made of a transparent material, the entire side face of the glass body becomes the transparent part, which means that the orientation of the image on the image display part can be changed at will to the horizontal direction by changing the orientation of the reflective mirror to the horizontal direction. Also, the orientation of the image can be changed at will to the vertical direction by changing the orientation of the reflective mirror to the vertical direction. This way, the user can enjoy the image not only from the side face of the glass, but also from the top opening through the drink.

Also, against convention, fixing the image display device (mobile communication device) on the side face of the glass body using a fixing mechanism eliminates the need to lift the glass body when inserting or removing the image display device (mobile communication device), the result of which is the ability to answer an unexpected incoming call.

Insertion and removal will be made easier when an insertion opening through which to insert the image display device, and a storage part for storing the image display device, are used as the fixing mechanism.

Constituting the storage part with a flexible material allows the image display device to be operated with the user's hand, etc., from the exterior of the storage part. In the storage part, not only the image display device (mobile communication device), but also a photograph, playing card or other card with a picture printed on it, etc., may be stored, so that the user can view not only the image on the image display device, but also the printed side of the photograph or card, from the side face of the glass via the reflective mirror and the transparent part.

A majority of commercially available smartphones, mobile phones and other communication devices have an acceleration sensor inside. Because an acceleration sensor is capable of capturing acceleration along three axes, the data acquired by the acceleration sensor can be used to detect user operations performed on the glass body. Furthermore, an output signal can be transmitted to an external computer at the timing of detection of a user operation. This makes it possible to change the image displayed on the image display part, or change the voice output from the voice output part, of a personal computer, server, mobile phone, smartphone, etc., in a remote location at the timing of performance, by the user, of an operation of tilting the drinking dramatization glass proposed by the present invention or clinking it against other object (toasting operation). Also, the number of toasting operations can be tallied and published by a remote server.

If the mobile communication device has a camera, images captured by the camera can also be transferred to remote locations.

If the mobile communication device has a vibrator, the vibrator may be vibrated at the timings of transmitting and receiving data. If the drink filled in the glass body is a carbonated drink, this vibration can produce the dramatizing effect of fizzing.

BRIEF DESCRIPTION OF THE DRAWINGS

FIG. 1 A perspective view (a), and a top cross-sectional view (b), showing the drinking dramatization glass in the first embodiment.

FIG. 2 Top cross-sectional views (a), (b), and a perspective view (c), of examples of patterns in which the angle of the reflective mirror is changed.

FIG. 3 Perspective views (a), (b) showing a mode where the transparent part does not have lens function, and a mode where it has lens function, respectively.

FIG. 4 A perspective view showing a bottle-type drinking dramatization glass.

FIG. 5 An example of using a flexible material for the storage part to make push operations on the touch panel possible.

FIG. 6 An example of fixing an image display device on the glass using a fixing mechanism.

FIG. 7 A perspective view showing the drinking dramatization glass in the second embodiment.

FIG. 8 A drawing showing a state where a drinking dramatization glass, etc., is connected to a communication line.

FIG. 9 A block diagram showing the internal system constitution of a drinking dramatization glass that detects the operated state of the glass using an acceleration sensor, and transmits a signal.

FIG. 10 A block diagram showing the internal system constitution of a drinking dramatization glass that vibrates a vibrator when a communication is transmitted or received.

FIG. 11 A drawing showing the constitution of the drinking dramatization system in the first embodiment (an example of changing the image on an external image display device).

FIG. 12 A drawing showing the constitution of the drinking dramatization system in the second embodiment (an example of changing the image and sound by utilizing the reflected image shown on the reflective mirror).

FIG. 13 Drawings (a), (b) explaining how the reflected image is flipped via the reflective mirror.

FIG. 14 A flowchart of a horizontal image flipping program in a mobile communication device.

FIG. 15 A flowchart of a vertical image flipping program in a mobile communication device.

FIG. 16 A drawing showing the constitution of a remote toast counter system.

MODE FOR CARRYING OUT THE INVENTION

First Embodiment of Drinking Dramatization Glass

The first embodiment of the drinking dramatization glass proposed by the present invention is described below using drawings.

As shown in FIG. 1, the drinking dramatization glass 1 is roughly constituted by a glass body 10, a fixing mechanism 16, a reflective mirror 30, and a transparent part 12.

The glass body 10 is a bottomed cylinder with a top opening 11, allowing a drink or other liquid L to be filled inside. The material for the glass body 10 may be glass, resin, ceramic, porcelain, etc., just like for general glasses.

The fixing mechanism 16 is a member for fixing an image display device 80 on the side face of the glass body 10. In this embodiment, an insertion opening 21 through which to insert the image display device 80, and a storage part 20 for storing the image display device 80, are provided as the fixing mechanism 16.

The reflective mirror 30 is placed inside the glass body 10 and used for reflecting, in the direction of the transparent part 12, an image 81 (the letter "A" in this embodiment) displayed on an image display part 85 of the image display device 80.

The transparent part 12 is provided on the side face of the glass body 10 for allowing a user U to view the image 81 from the exterior. The user U can view, from the side face via the reflective mirror 30, the image 81 on the image display device 80 as stored in the storage part 20.

The optical path connecting the image display device 80 and the reflective mirror 30, and the one connecting the reflective mirror 30 and the transparent part 12, travel through the drink L in the glass body 10. If the drink L is whiskey or otherwise amber in color, the image viewed by the user U through the transparent part 12 takes on the color of this drink L, which achieves the dramatizing effect of coloring the image according to the color of the drink L filled in the glass body 10.

Based on the basic law of physics in optical science that the angle of incidence equals the angle of reflection for any given light, an ideal angle is obtained as 45 degrees for both the angle formed by the image display part 85 of the image display device 80 and the reflective mirror 30, and the angle formed by the reflective mirror 30 and the transparent part 12, as shown in FIG. 1 (b). By setting these angles to 45 degrees, the user U can view an undistorted image 83 from the side face of the glass body 10. It should be noted that in FIG. 1 (a), the symbol 82 indicates the image reflected on the reflective mirror 30, of the image 81, as viewed from the user U side.

It should be noted that the image 83 actually seen through the transparent part 12 has been reflected on the reflective mirror 30 and thus horizontally flipped; however, this can be resolved by horizontally flipping the image 81 beforehand through image processing on the image display device 80 side.

Furthermore, since the refractive index of the drink L is different from that of air, pouring the drink L in the glass body 10 also achieves the dramatizing effect of magnifying the image display part 85 of the image display device 80 as viewed from the user U. It should be noted that, among underwater photographers and divers, it is a well-known fact that objects in water appear approx. 1.3 times larger due to the ratio of the refractive indexes of water and air.

It should be noted that a structure may be provided, pertaining to a supporting mechanism 31 for supporting the reflective mirror 30 inside the glass body 10, that allows the orientation of the reflective mirror 30 to be changed in the horizontal direction and/or in the vertical direction. This way, the angle formed by the reflective mirror 30 and the image display device 80 (image display part 85) can be adjusted arbitrarily, as shown in FIGS. 2 (a), (b), and the user U can view images from arbitrary positions around the glass body 10. When the angle formed by the reflective mirror 30 is adjusted so as to reflect the image 81 in the direction of the top opening 11, as shown in FIG. 2 (c), the image 81 will be viewed by the user U from the top opening 11 through the drink in the glass body 10. Reflecting the image 81 in the direction of the top opening 11 using the reflective mirror 30, as shown in FIG. 2 (c), vertically flips the reflected image of the image 81 as viewed by the user U; however, this can be resolved by vertically flipping the image 81 beforehand through image processing on the image display device 80 side.

As shown in FIG. 3 (b), constituting the transparent part 12 as a glass lens or other lens mechanism 15, or fixing a lens mechanism 15 over the transparent part 12, allows the image 83 viewed from the exterior of the glass body 10 to be magnified for display.

Besides being a so-called mug type with a handle 13 as shown in FIG. 1, the shape of the glass body 10 may be a bottle type having a lid 14 for closing off the top opening 11 as shown in FIG. 4, or shaped as a liquor bottle, PET bottle container for soft drinks, or shaker bottle used for making cocktails.

As shown in FIG. 5, the material with which to constitute the storage part 20 may be polyethylene terephthalate used for PET bottles, etc., or other material having enough flexibility to deform when an external force is applied. In this case, the mobile communication device 100 can be pushed and operated by elastically deforming the storage part 20 via application, from the exterior of the storage part 20, of an external force using the user's hand 50 or finger or an object (a spoon, chopstick, etc., will be used for actual push operations, instead of human body parts, from the viewpoint of hygiene). Normally, smartphones and mobile phones have buttons and/or a touch panel, and these devices can be operated from the exterior of the glass body 10 while a drink is filled therein. It should be noted that, to facilitate the operations further, the storage part 20 may be partially formed with a clear soft vinyl chloride (commonly known as "soft PVC," which is a waterproof material often used for float tubes) or other highly pliable material.

As shown in FIG. 6, the image display device 80 or mobile communication device 100 may be fixed on the glass body 10 using screws, clamps, or other widely known means as the fixing mechanism 16, instead of using the storage part 20, etc. Also, the image display device 80 or mobile communication device 100 may be fixed on the glass body 10 by wrapping a rubber band or belt around it.

Second Embodiment of Drinking Dramatization Glass

The second embodiment of the drinking dramatization glass proposed by the present invention is explained below using drawings; it should be noted, however, that locations constitutionally identical to those in the drinking dramatization glass 1 in the aforementioned first embodiment are denoted with the same symbols and not explained.

As shown in FIG. 7, the user U can view, through the transparent part 12, various image content that utilizes the communication function of the mobile communication device 100.

The mobile communication device 100 is a general term for devices that permit exchange of sound and image data (radio waves) among multiple such devices via a communication line A, such as mobile phones, smartphones, mobile tablet terminals, and PDAs, for example.

An image display part 101 outputs image content 150 and other images. A voice output part 102 is a so-called speaker for outputting voice content 151 and other sounds, as well as voices during calls, from the mobile communication device 100. A microphone 103 is a voice input device used during calls through the mobile communication device 100.

The communication line A may be the Internet or other network, or a telephone line and, as shown in FIG. 8, the drinking dramatization glass is connected to other personal computer, a remote server computer, the internal computer of other drinking dramatization glass, etc.

A majority of models of mobile phones, smartphones and other mobile communication terminals have a built-in acceleration sensor. An acceleration sensor allows for acquisition, based on the acceleration of the object into which the acceleration sensor is built, of the amount of movement or tilting of the object, as well as whether or not the object has hit another object.

The drinking dramatization glass in this embodiment has a user operation detection part 106 for monitoring the values of sensor-acquired data 160 of an acceleration sensor 105 in the mobile communication device 100, as shown in FIG. 9. A user operation of moving or tilting the glass body 10 or clinking it against other object is detected, and, at the timing of detection of the user operation, an operation detection signal 161 indicating that the user operation has been detected, or the sensor-acquired data 160, is transmitted, via a wireless communication device 110, to an external mobile communication device 202, remote server computer 203, etc.

The algorithm for detecting whether or not a user operation has been performed could conceivably be the simplest algorithm of detecting a moving operation, tilting operation or clinking against other object based on whether or not the pre-determined threshold of acceleration generated by such operation has been exceeded; however, the algorithm is not limited to the foregoing, and other algorithm may be used. Also, the user operation detection part 106 may be installed in the internal computer 200 for control of the mobile communication device 100 as software, or built into the interior of the mobile communication device 100 as a dedicated IC.

This way, the image or sound on the external mobile communication device 202 can be controlled according to the user U's operation of the glass body 10. Also, operations of clinking the glass body 10 against other object (toasting operations) can be monitored and tallied using the remote server computer 203 and the count, published to the world in real time. It should be noted that, at the timing of detecting a user operation, an image near the glass body 10 may be captured using a camera 104 in the mobile communication device 100 so that it can be transmitted together with an operation detection signal 161 or sensor-acquired data 160.

Also, by vibrating a vibrator 130 (commonly known as a vibrator) in the mobile communication device 100 at the timing of transmitting an operation detection signal 161 or sensor-acquired data 160, the user can be notified of the transmission of operation detection signal 161 or sensor-acquired data 160.

Third Embodiment of Drinking Dramatization Glass

The third embodiment of the drinking dramatization glass proposed by the present invention is explained below using drawings; it should be noted, however, that locations constitutionally identical to those in the drinking dramatization glass 1 in each of the aforementioned embodiments are denoted with the same symbols and not explained.

As shown in FIG. 10, when data has been transmitted or received via the wireless communication device 110, the vibrator 130 in the mobile communication device 100 can be vibrated at this timing to notify the user of the transmission or reception of data by the mobile communication device 100. If a fizzy carbonated drink is filled inside the glass body 10, specific data can be transmitted to the mobile communication device 100 at the glass body 10 from an external mobile communication device 202 or remote server computer 203, to vibrate the vibrator 130 in that mobile communication device 100 and thereby generate bubbles in the carbonated drink. In other words, generation of bubbles in the carbonated drink inside the glass body 10 in a remote location can be controlled from the mobile communication device 202, remote server computer 203, etc.

First Embodiment of Drinking Dramatization System

The first embodiment of the drinking dramatization system proposed by the present invention is explained below using drawings. Locations constitutionally identical to those in the drinking dramatization glass in each of the aforementioned embodiments are denoted with the same symbols and not explained.

As explained in the second embodiment of drinking dramatization glass, the drinking dramatization glass proposed by the present invention can detect a user operation performed on the glass body 10 using an acceleration sensor 105 in the mobile communication device 100, and transmit it as an output signal 161 to a remote server computer 203, etc. This system comprises, as shown in FIG. 11, the drinking dramatization glass 1 proposed by the present invention, an external image display device 205, and an external computer 204 (including, specifically, an external personal computer 201, remote server computer 203, etc.) for controlling the image thereon.

A user operation detected by the acceleration sensor 105 in the mobile communication device 100 is transmitted to the exterior through the wireless communication device 110, over the communication line A, as an output signal 161. The external computer 204 receives this output signal 161, and outputs an image content 152 according to the output signal 161 (the letters "go" in this embodiment) to the external image display device 205. This way, an operation of tilting or moving the glass or clinking it against other object (toasting operation) can be utilized to control the image currently output on the external image display device 205 such as a projector, large-screen display, etc. Also, the image output to the drinking dramatization glass 1 on which the operation was detected, and the image output to other drinking dramatization glass 2, can be synchronized using the glass tilting or moving operation, etc., as a trigger.

Second Embodiment of Drinking Dramatization System

The second embodiment of the drinking dramatization glass-based system proposed by the present invention is explained below. Locations constitutionally identical to those in the drinking dramatization glass in each of the aforementioned embodiments are denoted with the same symbols and not explained.

Since the angle of incidence equals the angle of reflection for any given light, the user U, while viewing an image via the reflective mirror 30, is reflected on the reflective mirror 30 when viewed from the mobile communication device 100. Utilizing this phenomenon, the user U, his/her hand 50, etc., as reflected on the reflective mirror 30 are captured using the camera 104 built into the mobile communication device 100. Thereafter, a camera-captured image 170 may be put through image analysis by the internal computer 200 of the mobile communication device 100, to change the image content 150 or voice content 151 output to the mobile communication device 100.

One example is to output a specific voice as a voice content 151 when the internal computer 200 recognizes the face of the user U as a result of analyzing the camera-captured image 170, and output a specific image as an image content 150 when it recognizes the user's hand 50. This way, the user's hand or a body part of the user U can be utilized to control the image and sound output to the mobile communication device 100.

It should be noted that, for the image analysis and identification algorithm used on the captured image in this embodiment, any existing algorithm for image analysis and recognition (face or facial expression recognition, etc.) may be used; however, the algorithm is not limited to the foregoing. For example, an algorithm that detects the user's hand 50 or other body part simply based on whether or not an object in a human skin color (bisque color of R=255, G=228, B=196, etc.) has been reflected (or more accurately, detects any reflected image having RGB values indicating a skin color, as the user's hand 50), may be used. Also, in this case, an algorithm that analyzes the illumination intensity of lighting in the room where the glass body 10 is, may be embedded at the same time. For example, the simplest algorithm can, based on the fact that the RGB values of all pixels in the captured image become closer to white (R=255, G=255, B=255) in a bright room, analyze the illumination intensity of lighting by calculating how close the pixels are to the RGB values of white. As a result, a control may be implemented that changes the image and sound output to the mobile communication device 100 according to whether or not there is lighting in the room.

Third Embodiment of Drinking Dramatization System

The third embodiment of the drinking dramatization glass-based system proposed by the present invention is explained below. Locations constitutionally identical to those in the drinking dramatization glass in each of the aforementioned embodiments are denoted with the same symbols and not explained.

As explained in the aforementioned first embodiment, it is such that, while the user U is viewing an image via the reflective mirror 30, the image 81 on the mobile communication device 100 is reflected via the reflective mirror 30 and therefore the image 83 entering the user U's eyes is horizontally flipped or vertically flipped (as a mirror copy), as shown in FIG. 13 (a) or FIG. 13 (b). To avoid this, horizontal flipping or vertical flipping should be performed on the image, beforehand, in the internal computer 200 of the mobile communication device 100.

FIG. 14 shows a flowchart of how the internal computer 200 operates when horizontally flipping an image.

In STEP 1, an original un-flipped image 81 is loaded from the memory of the internal computer 200. In STEP 2, a known horizontal image flipping process (such as a process to swap the left and right coordinates of all pixels in the image) is performed, to create a horizontally flipped image 86. Then, in STEP 3, this horizontally flipped image 86 is output. It should be noted that the image flipping program in this flowchart may be embedded not only in the internal computer 200 of the mobile communication device 100, but also in an IC chip or other computer inside the image display device 80 (FIG. 1).

FIG. 15 shows a flowchart of how the internal computer 200 operates when vertically flipping an image. In STEP 1, an original un-flipped image 81 is loaded from the memory of the internal computer 200. In STEP 2, a known vertical image flipping process (such as a process to swap the top and bottom coordinates of all pixels in the image) is performed, to create a vertically flipped image 87. Then, in STEP 3, this vertically flipped image 87 is output. Vertically flipping an image is the same as horizontally flipping it, except that the swapping of pixel coordinates is performed in the vertical direction instead of the horizontal direction, and the basic processing and program are the same for both processes.

Embodiment of Remote Toast Counter System

An embodiment of the remote toast counter system proposed by the present invention is explained below. Locations constitutionally identical to those in the drinking dramatization glass in each of the aforementioned embodiments are denoted with the same symbols and not explained.

As described above in the second embodiment of drinking dramatization glass, the drinking dramatization glass proposed by the present invention can detect a user operation performed on the glass body 10 using an acceleration sensor 105 in the mobile communication device 100, and transmit it to a remote server computer 203, etc. As shown in FIG. 16, a remote toast counter system can be obtained by setting up the remote server computer 203 to count the number of times the signal has been received and to record the result as a cumulative number of toast operations to be viewed and published.

If the glass body 10 has a bottle-type shape with a lid 14, or specifically the shape of a shaker bottle used for making cocktails, this remote toast counter system also presents the advantage of being able to count the number of times the shaker bottle has been shaken.

INDUSTRIAL FIELD OF APPLICATION

The present invention relates to a drinking dramatization glass that lets an individual enjoy oneself alone or together with others in remote locations, while also presenting many different dramatizing effects. Additionally, the present invention relates to a drinking dramatization glass that allows an image display device to be fixed with ease on the glass body, while also allowing the orientation of an image display part of the image display device to be changed with ease. Additionally, the present invention relates to a drinking dramatization system and a remote toast counter system, both using such drinking dramatization glasses, as well as a storage medium for use therewith. Based on the above, the present invention has industrial applicability.

DESCRIPTION OF THE SYMBOLS

U User
L Liquid (drink)
A Communication line
1 Drinking dramatization glass
2 Drinking dramatization glass
10 Glass body 11 Top opening
12 Transparent part
13 Handle
14 Lid
15 Lens mechanism
16 Fixing mechanism
20 Storage part
21 Insertion opening
30 Reflective mirror
31 Supporting mechanism
50 User's hand
80 Image display device
81 Image
82 Image
83 Image (reflected)
85 Image display part
86 Horizontally flipped image
87 Vertically flipped image
100 Mobile communication device
101 Image display part
102 Speaker
103 Microphone (sound sensor)
104 Camera (camera sensor)
105 Acceleration sensor
106 User operation detection part
110 Wireless communication device
111 Antenna
130 Vibrator
150 Image content
151 Voice content
152 Image content (for external image display device)
160 Sensor-acquired data
161 Output signal (operation detection signal, etc.)
162 Vibrator control signal
170 Camera-captured image
200 Internal computer (control part)
201 Personal computer
202 External mobile communication device
203 Remote server computer
204 External computer
205 External image display device

What is claimed is:

1. A drinking dramatization glass, comprising:
a glass body being a bottomed cylinder with a top opening;
a fixing mechanism for fixing an image display device including an image display part, on a side face of the glass body in a manner coupling the image display device solely to the side face;
a transparent part disposed apart from the image display part for viewing, from an exterior of the glass body, an image displayed on the image display part of the image display device; and
a reflective mirror placed inside the glass body and having at least one layer that does not transmit light;
wherein the image displayed on the image display part is reflected on the reflective mirror, passes through the transparent part, and reaches an exterior of the glass body.

2. The drinking dramatization glass according to claim 1, characterized in that the image display device is a part of a mobile communication device.

3. The drinking dramatization glass according to claim 2, characterized in that a part or all of the transparent part constitutes a lens so that the image display part can be magnified for viewing from the exterior of the glass body.

4. The drinking dramatization glass according to claim 2, characterized in that a reflecting direction of the image is changed in a horizontal direction and/or in a vertical direction by changing an orientation of the reflective mirror between a horizontal direction and a vertical direction.

5. The drinking dramatization glass according to claim 2, characterized in that the fixing mechanism comprises an insertion opening through which to insert the image display device, and a storage part for storing the image display device.

6. The drinking dramatization glass according to claim 2, characterized by having a lid for closing off the top opening.

7. The drinking dramatization glass according to claim 2, characterized in that the image display device is a part of a mobile communication device, the mobile communication device has a user operation detection part and an acceleration sensor, and the user operation detection part detects, based on output data from the acceleration sensor, whether a user has moved or tilted the glass body or clinked it against other object (hereinafter referred to as "user operation") and transmits an output signal to the exterior.

8. The drinking dramatization glass according to claim 1, characterized in that a part or all of the transparent part constitutes a lens so that the image display part can be magnified for viewing from the exterior of the glass body.

9. The drinking dramatization glass according to claim 1, characterized in that a reflecting direction of the image is changed in a horizontal direction and/or in a vertical direction by changing an orientation of the reflective mirror between a horizontal direction and a vertical direction.

10. The drinking dramatization glass according to claim 1, characterized in that the fixing mechanism comprises an insertion opening through which to insert the image display device, and a storage part for storing the image display device.

11. The drinking dramatization glass according to claim 10, characterized in that the storage part is made of a flexible material, and by applying an external force, the storage part can be deformed to operate the image display device in the storage part.

12. The drinking dramatization glass according to claim 1, characterized by having a lid for closing off the top opening.

13. The drinking dramatization glass according to claim 1, characterized in that the image display device is a part of a mobile communication device, the mobile communication device has a user operation detection part and an acceleration sensor, and the user operation detection part detects, based on output data from the acceleration sensor, whether a user has moved or tilted the glass body or clinked it against other object (hereinafter referred to as "user operation") and transmits an output signal to the exterior.

14. The drinking dramatization glass according to claim 13, characterized in that the mobile communication device has a camera, and the camera captures an image at a timing of detection of the user operation by the user operation detection part and transmits the captured image data to the exterior.

15. A drinking dramatization system having the drinking dramatization glass according to claim 14; characterized in that a sound and/or image output from the mobile communication device changes based on an image of the reflective mirror as captured by the camera.

16. A drinking dramatization system comprising the drinking dramatization glass according to claim 13, an external computer, and an exterior image display device; characterized in that the exterior computer, upon receiving the output signal, generates prescribed image data and transmits it to the external image display device, and the external image display device displays the image data as image content.

17. A remote toast counter system comprising the drinking dramatization glass according to claim 13, and an external server computer; characterized in that the external server computer receives the output signal, counts a number of times the signal has been received, and records a result as a cumulative number of toasting operations, so that a user can view the cumulative number of toasting operations.

18. The drinking dramatization glass according to claim 1, characterized in that the image display device is a part of a mobile communication device, the mobile communication device has a vibrator, and the vibrator vibrates at a timing of communication performed by the mobile communication device via radio waves, thereby causing the glass body to vibrate.

19. The drinking dramatization glass according to claim 1, wherein the reflective mirror is a planar mirror set at an angle inclined with respect to a surface of the image display part, and the fixing mechanism fixes the image display device in a manner being detachable outwardly from the side face of the glass body.

20. The drinking dramatization glass according to claim 19, wherein the angle at which the reflective mirror is set is such that an angle of incidence of the image displayed on the image display part incident on the reflective mirror is 45 degrees.

* * * * *